US006366046B1

(12) United States Patent
Yan et al.

(10) Patent No.: US 6,366,046 B1
(45) Date of Patent: Apr. 2, 2002

(54) SYSTEM FOR SERVOMOTOR DRIVEN PRESS TO PERMIT PERFORMANCE OF MULTI PURPOSE TASKS

(75) Inventors: Hong-Sen Yan; Wei-Ren Chen, both of Tainan (TW)

(73) Assignee: National Science Council, Taipei (CN)

( * ) Notice: Subject to any disclaimer, the term of this patent is extended or adjusted under 35 U.S.C. 154(b) by 0 days.

(21) Appl. No.: 09/711,048

(22) Filed: Nov. 13, 2000

(30) Foreign Application Priority Data

Mar. 31, 2000 (TW) ....................................... 89106485 A

(51) Int. Cl.[7] ................................................ G05B 11/01

(52) U.S. Cl. .................. 318/560; 318/567; 318/568.16; 318/574

(58) Field of Search ................................. 318/560–561, 318/565–567, 568.1, 568.16, 568.17, 568.19, 569–572, 574, 652

(56) References Cited

U.S. PATENT DOCUMENTS

| | | | | | |
|---|---|---|---|---|---|
| 5,079,489 A | | 1/1992 | Ishii | | |
| 5,289,096 A | * | 2/1994 | Takeda | ........................ | 318/560 |
| 5,808,465 A | * | 9/1998 | Gentile et al. | .............. | 318/661 |

FOREIGN PATENT DOCUMENTS

| | | |
|---|---|---|
| TW | 248739 | 1/1983 |

OTHER PUBLICATIONS

Int. J. Mach Tools Manufact., vol. 31, No. 3, pp.345–359, 1991, A Servo Motor Driven Multi–Action Press For Sheet Metal Forming, S. Yossifon, D. Messerly, E. Kropp, R. Shivpuri and T. Altan

* cited by examiner

*Primary Examiner*—Marlon T. Fletcher
(74) *Attorney, Agent, or Firm*—Bucknam and Archer

(57) ABSTRACT

A general type press system with variable-speed slider-crank mechanism driven by a servomotor which can be used for various types of press work by providing various corresponding input speed trajectories. The press includes a frame, a linkage-mechanism with a crank as its input and a slider as its output, and a servomotor. The servomotor is used for driving the crank of the linkage-mechanism. The output motion of the press, i.e., the ram's motion, is accomplished by the slider of the mechanism. The speed of the servomotor is controlled by a micro-computer or a personal computer equipped with a digital signal processor (DSP). This computer supports a number of speed functions for different types of press work to obtain optimal processing results. Because the existing traditional linkage press can also be upgraded to a multi-purpose press, the disclosed press is an innovative design with the advantages of flexibility and practicability.

3 Claims, 12 Drawing Sheets

SYSTEM FOR SERVOMOTOR DRIVEN PRESS TO PERMIT PERFORMANCE OF MULTI PURPOSE TASKS

FIELD OF THE INVENTION

The present invention relates to a mechanical stamping press with variable speed slider-crank mechanism driven by a servomotor which can be used for various types of press work.

DESCRIPTION OF THE PRIOR ART

In the development of industrial technology continuous efforts are being made to enhance production precision for quality requirements. Many products which are widely used in industry presently are formed by cutting, forging, stretching, bending, and pressing processes. These manufacturing processes are achieved by means of a press.

Generally speaking, when the punch of the press starts to touch the work-piece during the cutting process, noise is accompanied with the impact and the life cycle of the tooling is also shortened. Therefore, low-speed cutting process is preferred. Also, in order to obtain a fine cutting edge, and protect the press machine and tooling from excessive wear, it is better to make fine cuts at low speed. In addition, in stretching process, the stretching speed should not be fast and should be within a maximum allowable stretching speed to avoid work-piece fracture. Furthermore, in order to get good work-piece quality, constant stretching speed in the working region is required.

Traditionally, the mechanical press has different kinds of driving mechanism depending on the type of process for which it is used. However, the only driving mechanism which is usually used in both cutting and stretching is the Watt II type linkage mechanism press. The Watt II type linkage press is shown in FIG. 1 and the AMADA-150L Watt II type linkage press is shown in FIG. 2. These presses cannot obtain a good finished quality because the ram of the presses doesn't operate at constant speed in working region. W. M. Hwang el. proposed a common linkage type of press in Taiwan Patent No. 248,739 for both stretching and cutting processes. However, the two processes are inherently different so that the Hwang el. solution is a compromise between the said processes rather than a satisfaction of both of them. In Int. J. Mach Tools Manufact., Vol. 31, No. 3, pp. 349–359, Yossifon et al.(1991) a new type of multi-function press driven by servomotor is proposed. A nut-screw mechanism is used to transfer circular motion from the servomotor to linear motion, which is then used to drive the sliding platform. However, due to lack of high mechanical advantage which the linkage-type press often possesses, the servomotor needs to provide high torque for smooth operation. U.S. Pat. No. 5,079,489 "Method of operating press machine and servo controller therefor" issued at Jan. 7, 1992 has claimed the similar concept of using a servomotor and its control system to control the press ram. However, what it does not mention is the proposal of using the combination of a servomotor, controller, and crank-slide linkage mechanism. Such a combination can offer a suitable speed function in different types of processes to control the servomotor.

BRIEF SUMMARY OF THE INVENTION

Based on the above, the present invention provides one kind of software-controlled servo press mechanism. This results in the input speed of the servomotor which can be controlled by software, so that the motor can run in different speed functions during the cutting and stretching processes. Therefore, this mechanism can achieve the optimal processing effect in the two types of processes.

The main object of this invention is to provide a common and multi-function crank-slide type press (system) with variable-speed servo controller. The system offers different input speed for different types of punching processes, which achieves the purpose of using a single press for different types of working processes.

Another object of this invention is to provide this common and multi-function crank-slide type press (system) with variable speed servo controller which can be applied to traditional mechanical press; this is namely a traditional press upgrade.

BRIEF DESCRIPTION OF THE DRAWINGS

The invention will now be described by way of example with reference to the accompanying Tables and Figures in which:

FIG. 6(*a*) shows the angular speed of the servomotor, and also the crank, while the kk curve represent the required speed function the servomotor and the hh curve represents the constant speed motion;

FIG. 6(*b*) shows the resulting slide speed for the press mechanism run in the speed function of FIG. 6(*a*). The kk curve represents the results of variable input speed while the hh curve represents the results of constant input speed for comparison;

FIG. 7(*a*) shows the angular speed of the servomotor, and also the crank, while the kk curve represent the required speed function the servomotor and the hh curve represents the constant speed motion.

FIG. 7(*b*) shows the resulting slide speed for the press mechanism run in the speed function of FIG. 7(*a*). The kk curve represents the results of variable input speed while the hh curve represents the results of constant input speed for comparison.

DETAILED DESCRIPTION OF THE INVENTION

Figure 1:
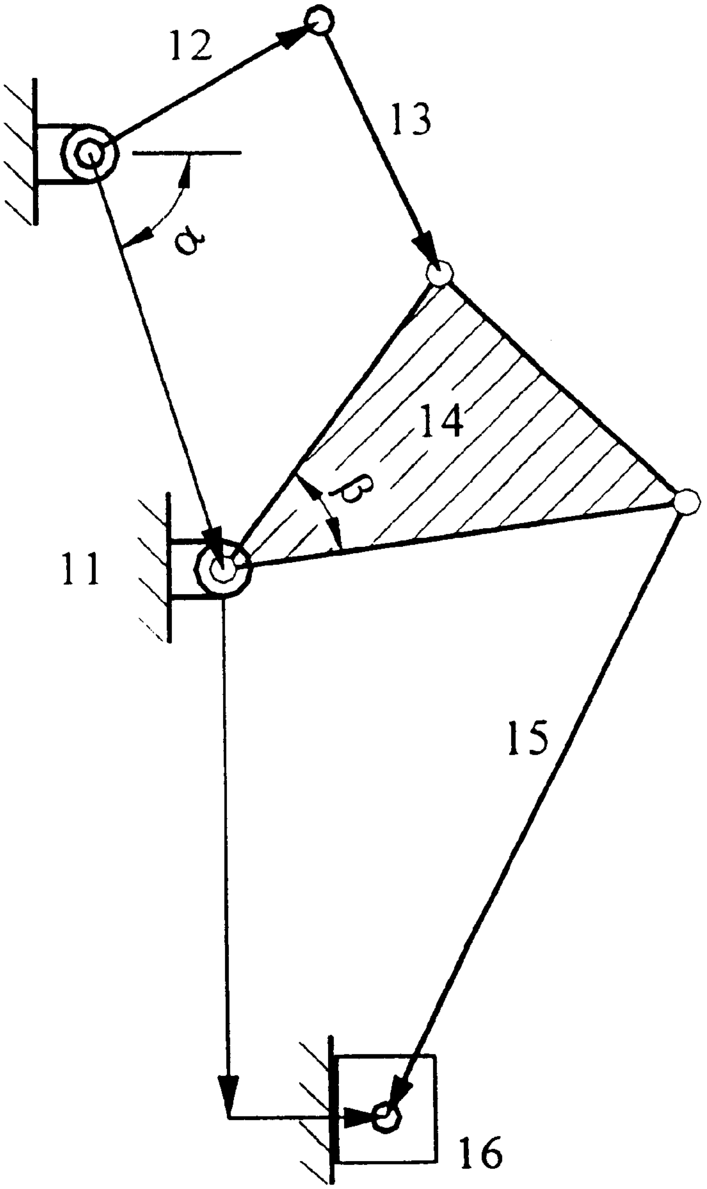
FIG. 1 shows the general mechanism structure of a Watt II type linkage press mechanism.
Figure 2:
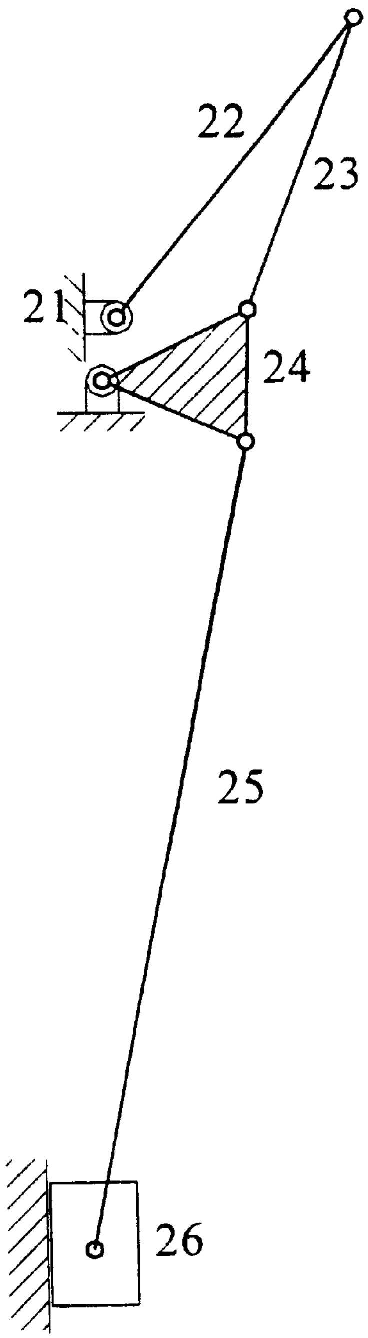
FIG. 2 shows the mechanism structure of the prior art AMADA-150L linkage press mechanism.

The traditional mechanical press has different kinds of driving mechanism depending on the different types of processes in which it is used. However, the only driving mechanism which is usually used in both cutting and stretching processes is the Watt II type linkage mechanism press, as shown in FIG. 1. The elements of the Watt II press frame are press frame (11), crank (12), connecting link 1 (13), connecting link 2 (14), connecting link 3 (15) slide (16), and B which is the geometric angle of linkage 2 (14). Currently, the Watt II type linkage mechanism press is used in industry for cutting and stretching processes. However, the AMADA150L linkage mechanism press shown in FIG. 2, due to dimension design has not been optimized for both cutting and stretching processes, since a constant speed cannot be obtained in the working region. Thus, good working quality cannot be obtained. The elements of AMADA150L are press frame (21), crank (22), connecting link 1 (23), connecting link 2 (24), connecting link 3 (25), slide (26).

Figure 3:
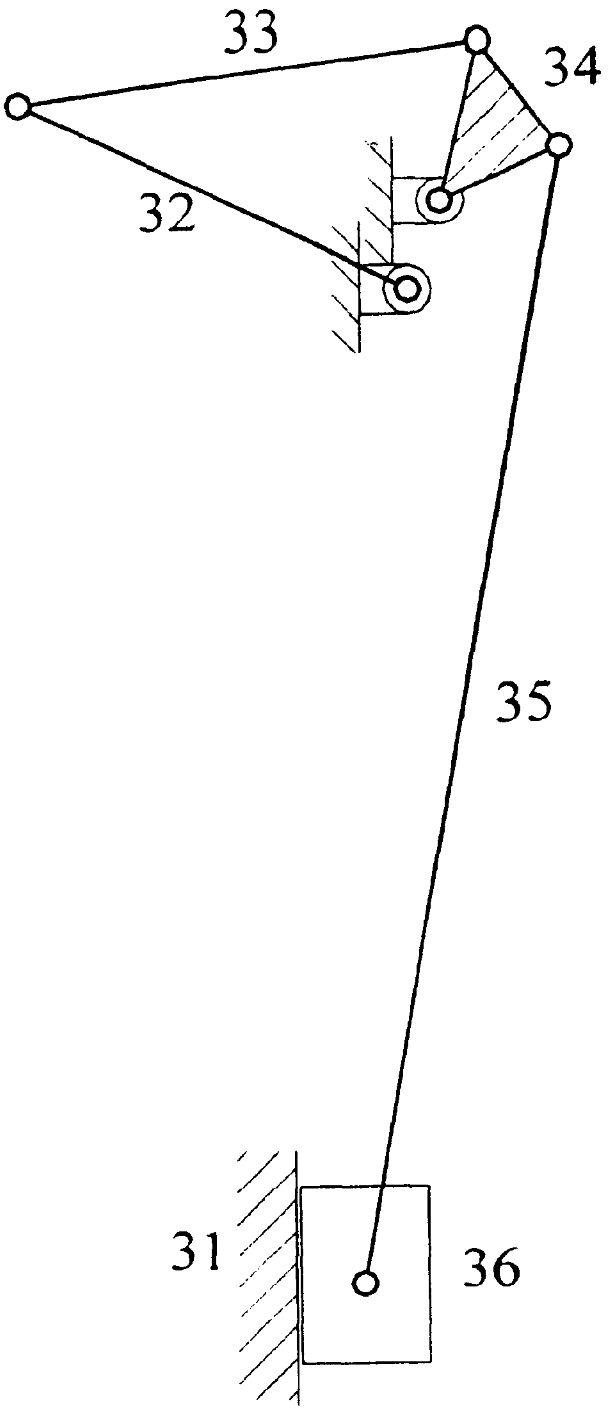
FIG. 3 shows the mechanism structure of the prior art of W. M. Hwang's (Taiwan Patent 248739) linkage press mechanism for stretching and cutting processes.
Figure 4A:
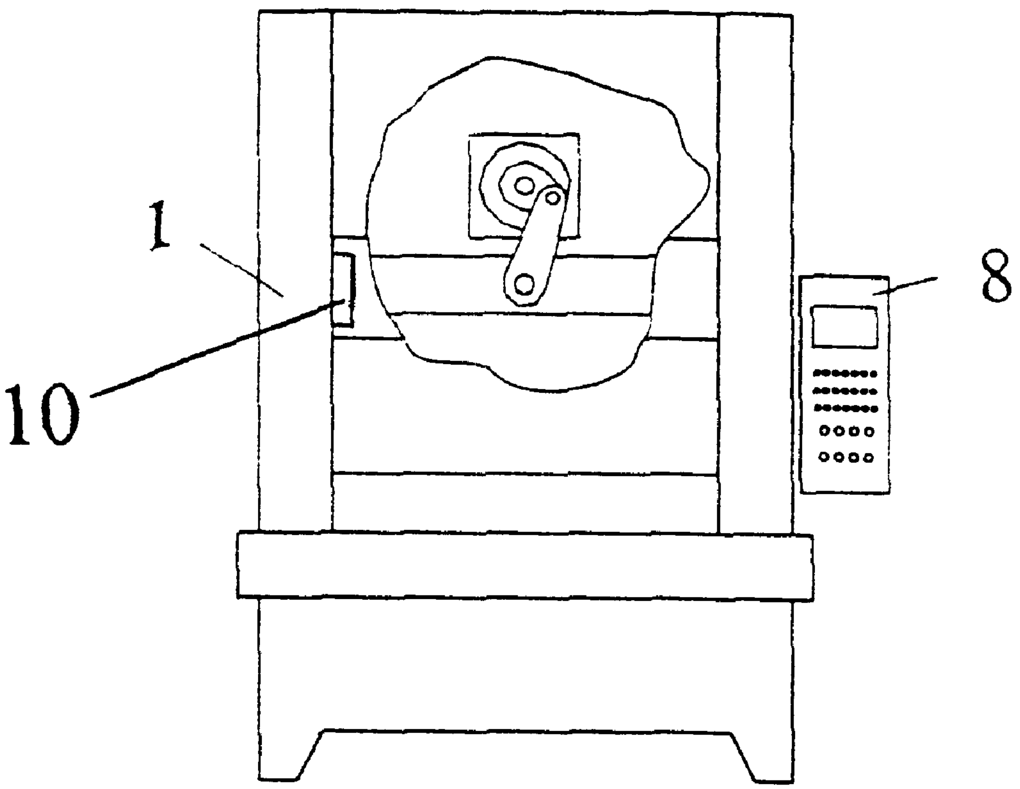
FIG. 4 shows the press system of crank-slide mechanism with servo controller according to the present invention.
Figure 4B:
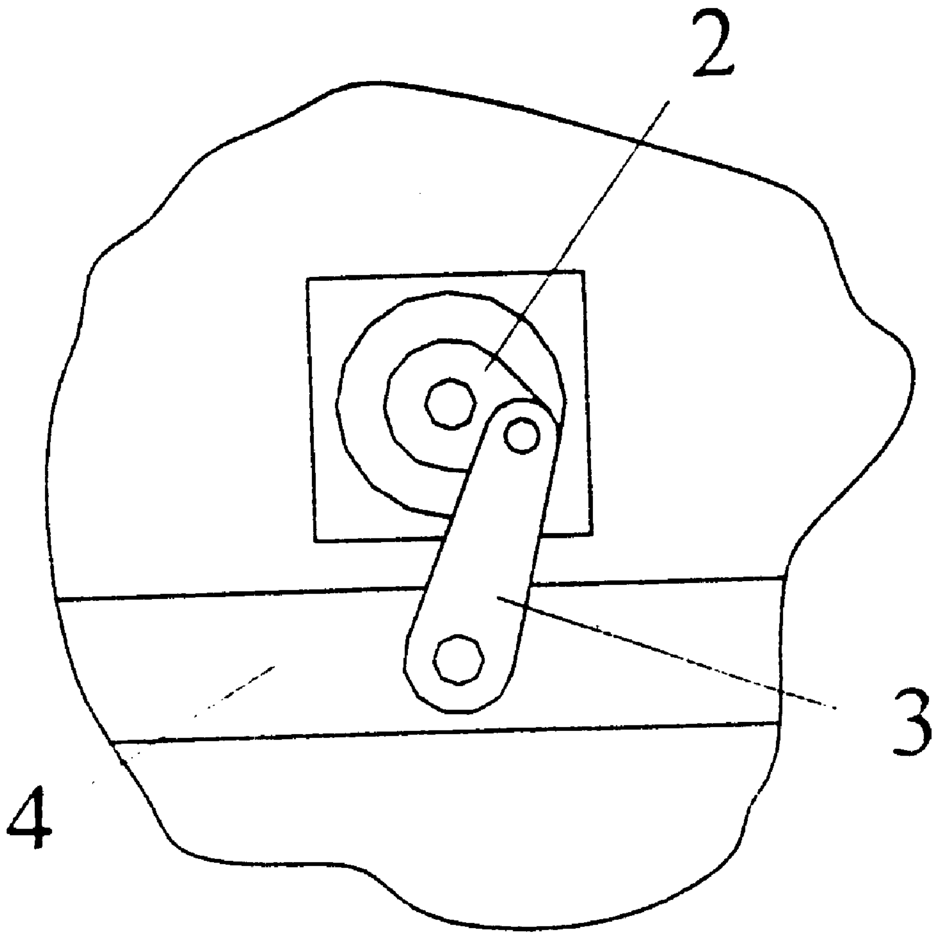
Figure 4C:
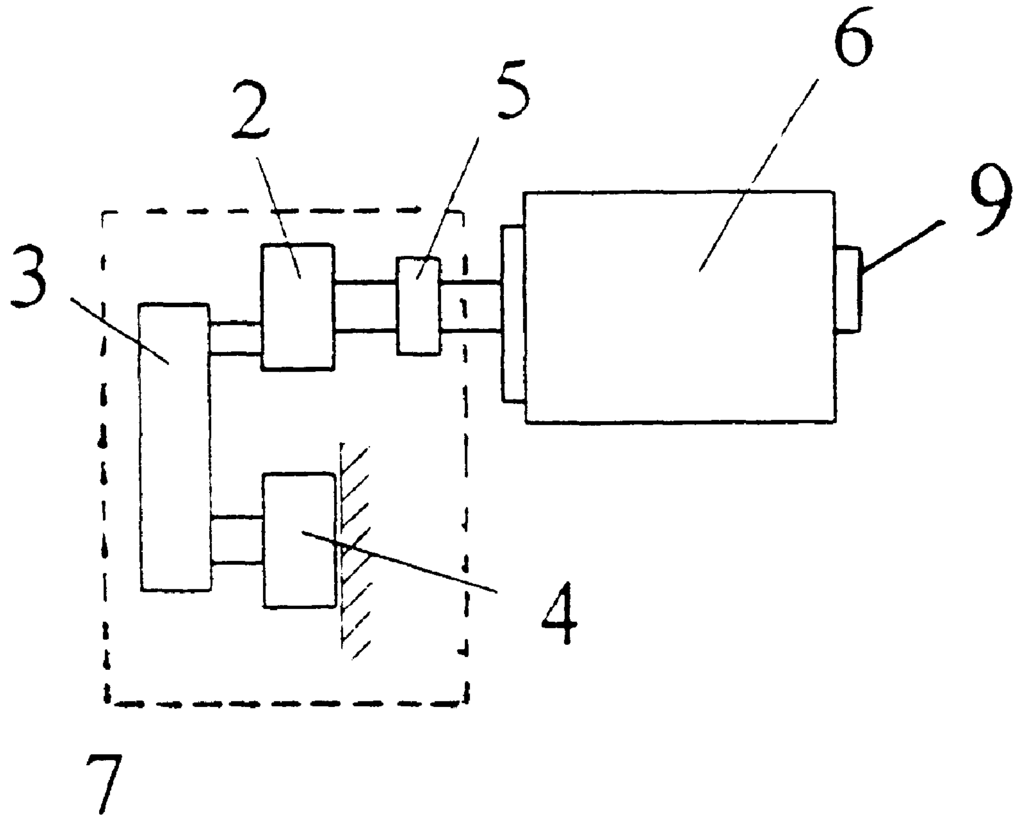
Figure 4D:
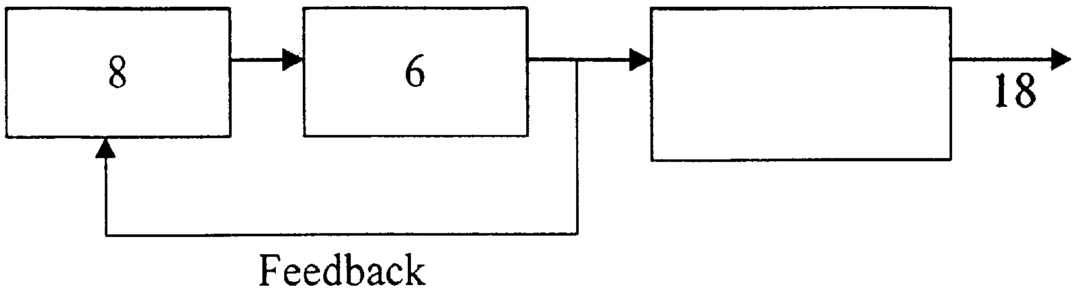

Taiwan Patent No. 248739 addresses a common linkage press of Watt II type and is shown in FIG. 3. The elements of Taiwan Patent No. 248739 are press frame (31), crank (32), connecting link 1 (33), connecting link 2 (34), connecting link 3 (35), slide (36). Its dimension design has been optimized for both cutting and stretching processes. However, since the two process are inherently different, this press is a compromise between the two processes rather than a satisfaction of both of them.

This invention springs from the concept of utilizing the combination of a servomotor, controller, and crank-slide linkage mechanism to control the servomotor through suitable speed function in different types of processes. The main purpose of using a servomotor and its control system to replace the fixed-speed motor, which is traditionally used in a press machine, is to enable the ram to have variable speed during the upward and downward strokes by controlling the speed of the servomotor. It also satisfies the need of changing the speed function of the ram for different working processes and working materials. By presetting suitable speed functions for different types of processes or material, the operator can select a suitable speed function to achieve the optimal effect of the process.

The present invention concerns a press system with multi-function, variable speed of crank-slide mechanism with servo controller. The purpose is to provide a common press system and an optimal pressing motion for achieving an optimal processing effect in different types of processes.

The press mechanism structure of this invention is shown in FIG. 4 and includes a variable speed of crank-slide mechanism with servo controller, a servomotor, a micro-computer controller, a linkage mechanism, and a coupling. The elements shown in FIG. 4 are a press machine shelf (1), a servo-motor (6) for press power source, a coupling mechanism (5) connecting the servomotor and the crank (2) of the linkage, a linkage mechanism (7) associated with crank (2), one or several linkage shafts (3), and a slide (4). Crank (2) is driven by servo motor (6) through coupling mechanism (5), and the linkage shafts transfer motion to slide (4).

A micro-computer based controller (8) is used for storing the required motor speed functions of different types of processes, and controls the chosen speed of servo motor (6) in time during press running.

The linkage mechanism with crank-input and slide-output is driven by the speed variable servomotor whereby the circular motion is transferred into reciprocating motion of the sliding block which is the power source of the ram.

The servomotor (6) is directly connected with the crank (2) of the crank-slide mechanism of the press via a coupling mechanism (5). Connecting link (3) connects the crank (2) and sliding block (4). A four-bar linkage mechanism (7) is therefore completed. Furthermore, a micro-computer based controller (8) equipped with digital signal processor (DSP) controls servomotor (6) by controlling the speed of the servomotor and applying different speed function in different working processes or for different materials. In addition a position sensor (or rotary encoder) (9) and a linear speed sensor (10) are equipped in the servomotor and the ram. These sensors release signals to the digital signal processor (DSP) and achieve feedback control for the servo-motor. The said sliding block (4) drives the ram (not shown) which is used for the pressing task.

The described press system with multi-function, variable speed of the crank-slide mechanism with servo controller can be used in the traditional press, which is basically an upgrading of the traditional mechanical press. By using a servomotor (6) to replace the normal induction motor in the in the traditional mechanical press and a micro-computer based controller (8) equipped with digital signal processor to deal with the signals from the position or speed sensors (encoders), the press is upgraded to have the same function as described herein.

Figure 5:
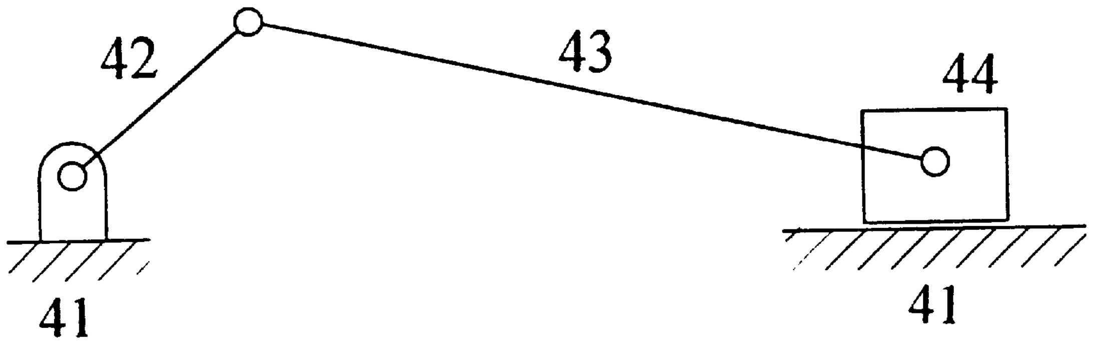
FIG. 5 shows the structure of a four-bar crank-slide linkage mechanism to which the variable speed functions of FIGS. 6 and 7 apply.
Figure 6:
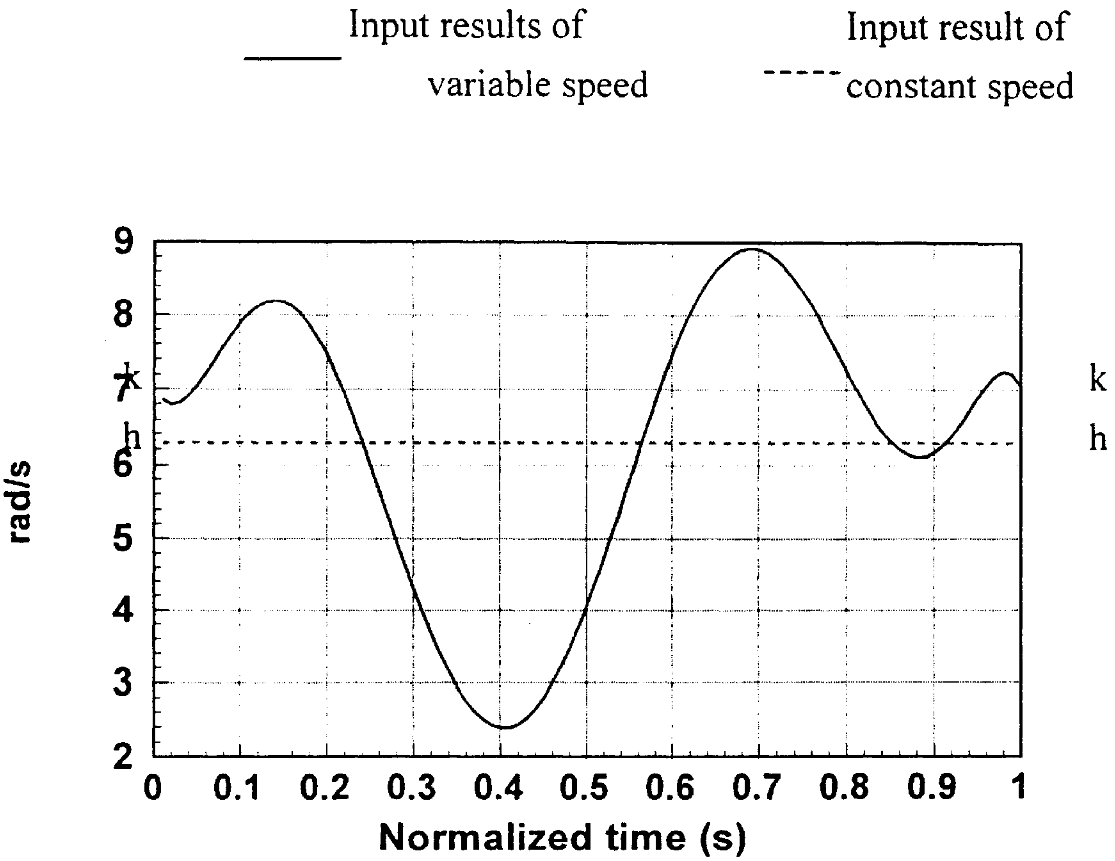
FIG. 6(*a*) and FIG. 6(*b*) show the motion characteristics of the press with mechanism structure in FIG. 5 to perform a cutting process.
Figure 6:
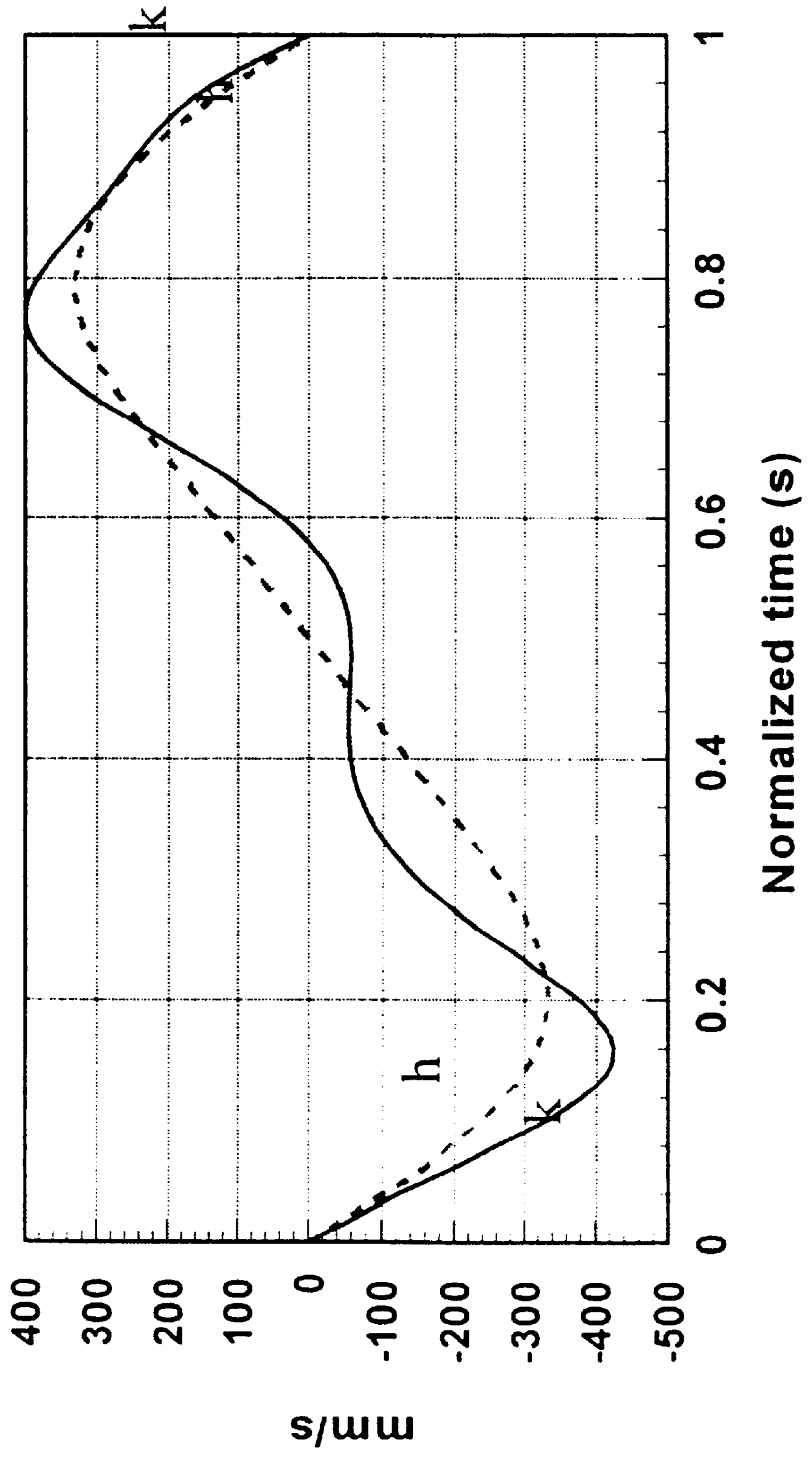
Figure 7:
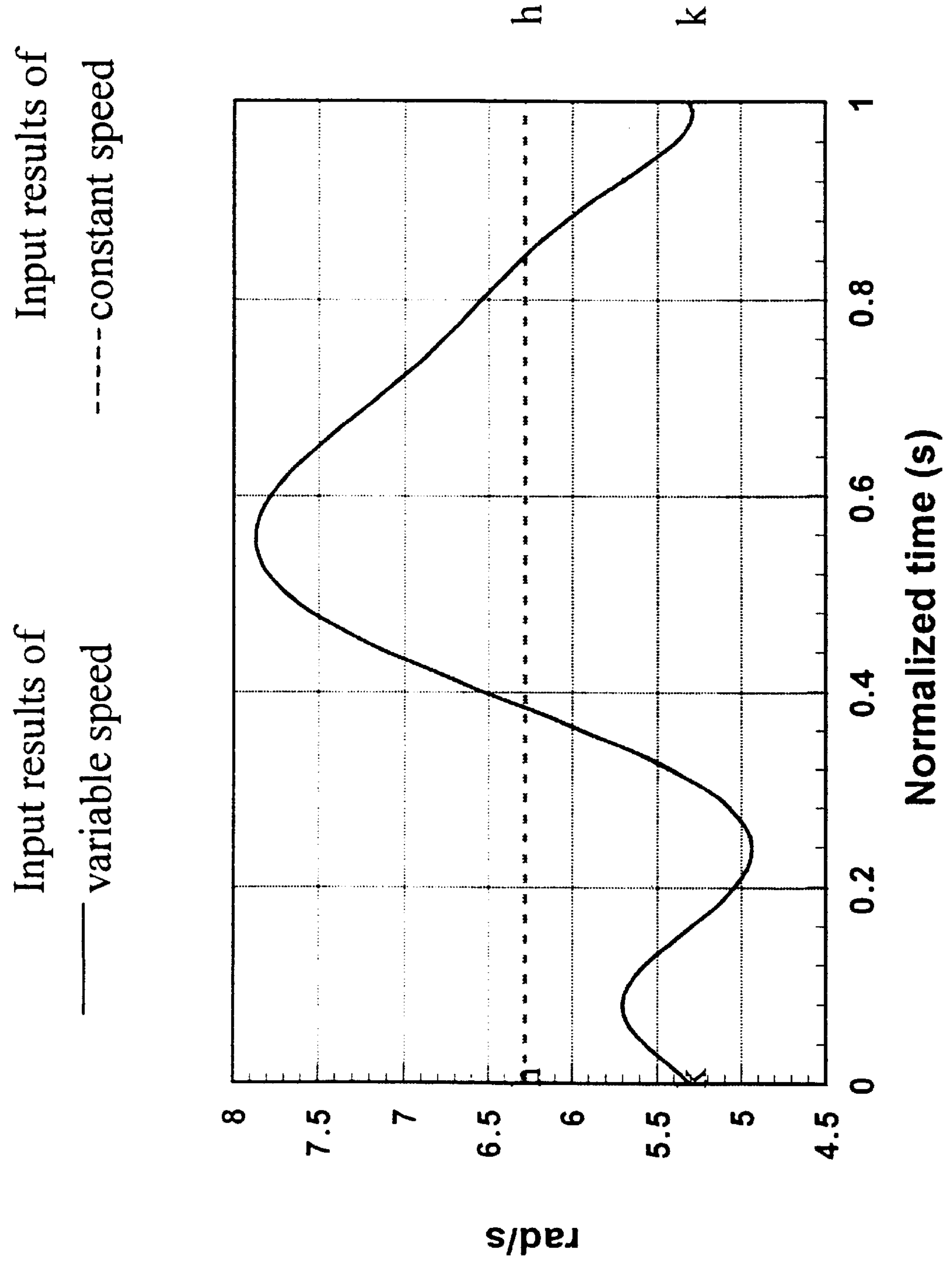
FIG. 7(*a*) and FIG. 7(*b*) show the motion characteristics of the press with mechanism structure in FIG. 5 to perform a deep drawing process.
Figure 7B:
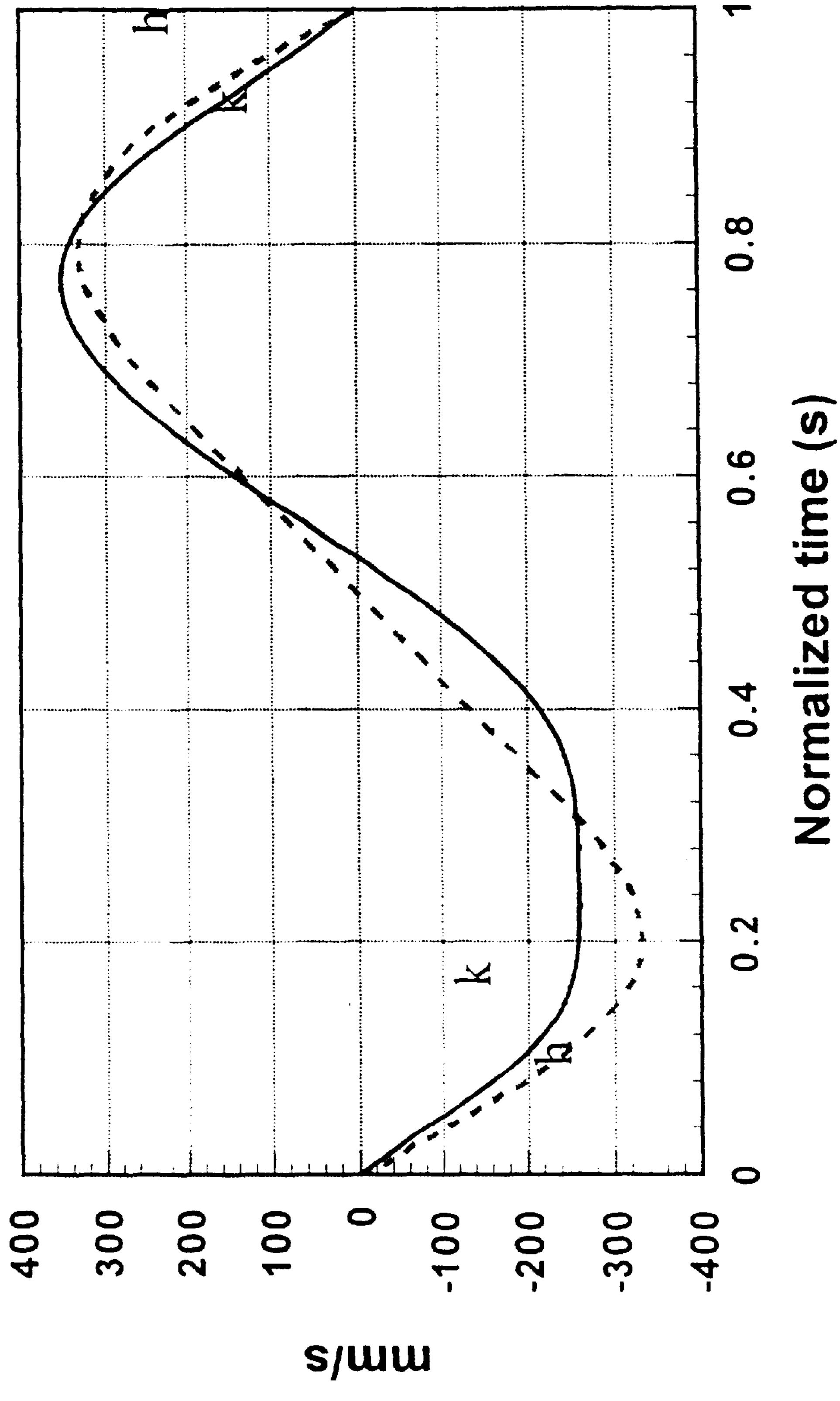

A four-bar crank-slide linkage mechanism is shown in FIG. 5. A description with two different curve diagrams of motor speed shown in FIGS. 6 and 7 follows:

1. In a cutting operation, the speed curve for the ram in FIG. 6(*b*) is achieved by using the controller within the micro-computer which controls the motor speed to follow the curve in FIG. 6(*a*) during one period. At normalized time 0.4 to 0.5, the ram has a low and nearly constant cutting speed. The speed of the ram is therefore very suitable for precision cutting.
2. In a stretching operation, the speed curve for the ram in FIG. 7(*b*) is achieved by using the controller within the micro-computer which controls the motor speed to follow the curve in FIG. 7(*a*) during one period. At normalized time 0.2 to 0.35, the ram has a nearly constant stretching speed. This small speed characteristic makes the press suitable for stretching processes.

What is claimed is:

1. A system for a mechanical press wherein the transmission mechanism has a rotational input member and a sliding output member so that the press is capable of performing different processes, said system comprising:

a) a servomotor as the power input of said press and which drives the rotational input member with variable speed;

b) a coupling connecting said servomotor to said rotational input member;

c) a PC-based controller for storing variable speed function trajectories corresponding to said different processes and performing in time control of said servomotor along the variable speed function trajectories for the different processes;

d) an angular positioning sensor associated with said servomotor for transmitting angular position information of said servomotor to said PC-based controller for in-time control thereof; and e) a linear positioning sensor associated with the sliding output member for transmitting linear position information of said member to said PC-based controller for in-time control of said servomotor;

wherein the variable speed function trajectories stored in said PC-based controller are made up of Bezier curves with sets of control points which depend on the link lengths of the press mechanism and the process being worked on, and the corresponding desired linear speed of said slide member is stored in said PC-based controller for verification.

2. The system as defined in claim 1, wherein said PC-based controller receives digital signals from said angular positioning sensor and estimates the in-time angular speed and compares it with the variable speed function trajectory so as to send suitable torque commands to the servomotor for real-time control.

3. The system as defined in claim 1, wherein said PC-based controller receives digital signals from said linear positioning sensor and estimates the in-time linear speed of said sliding member and compares with the corresponding linear speed of said slide member stored therein to verify the results of the real-time control.

* * * * *